(12) United States Patent
Bivens et al.

(10) Patent No.: US 8,527,704 B2
(45) Date of Patent: Sep. 3, 2013

(54) METHOD AND APPARATUS FOR OPTIMAL CACHE SIZING AND CONFIGURATION FOR LARGE MEMORY SYSTEMS

(75) Inventors: John Alan Bivens, Ossining, NY (US); Parijat Dube, Yorktown Heights, NY (US); Michael Mi Tsao, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/944,682

(22) Filed: Nov. 11, 2010

(65) Prior Publication Data

US 2012/0124318 A1 May 17, 2012

(51) Int. Cl.
*G06F 12/08* (2006.01)
*G06F 11/34* (2006.01)

(52) U.S. Cl.
CPC ........ *G06F 12/0802* (2013.01); *G06F 11/3447* (2013.01)
USPC ........................ 711/118; 703/2; 711/E12.017

(58) Field of Classification Search
None
See application file for complete search history.

(56) References Cited

U.S. PATENT DOCUMENTS

| | | | |
|---|---|---|---|
| 6,963,823 B1 * | 11/2005 | Abraham et al. | 703/2 |
| 6,973,417 B1 * | 12/2005 | Maxwell et al. | 703/2 |
| 7,020,854 B2 | 3/2006 | Killian et al. | |
| 7,103,517 B2 * | 9/2006 | Gluhovsky et al. | 703/2 |
| 7,430,633 B2 | 9/2008 | Church et al. | |
| 7,505,886 B1 * | 3/2009 | Alvarez et al. | 703/14 |
| 7,519,773 B2 | 4/2009 | Mcneill, Jr. | |
| 7,526,628 B2 | 4/2009 | Pullen et al. | |
| 7,562,004 B2 | 7/2009 | Osogami et al. | |
| 2004/0054850 A1 * | 3/2004 | Fisk | 711/112 |
| 2004/0193801 A1 | 9/2004 | Benhase et al. | |
| 2007/0136238 A1 * | 6/2007 | Bildhaeuser et al. | 707/2 |
| 2007/0239936 A1 | 10/2007 | Gluhovsky | |
| 2008/0209445 A1 | 8/2008 | Iyengar et al. | |
| 2008/0294846 A1 | 11/2008 | Bali et al. | |
| 2009/0210360 A1 | 8/2009 | Sankar et al. | |
| 2010/0037275 A1 | 2/2010 | Sofman et al. | |

OTHER PUBLICATIONS

Bruce L. Jacob et al. "An Analytical Model for Designing Memory Hierarchies." Oct. 1996. IEEE. IEEE Transactions on Computers. vol. 45. No. 10. pp. 1180-1194.*
David A. Patterson and John L. Hennessy. Computer Organization and Design. 1998. Morgan Kaufmann. $2^{nd}$ ed. pp. 540-544.*

(Continued)

*Primary Examiner* — Nathan Sadler
(74) *Attorney, Agent, or Firm* — August Law, LLC; George Willinghan

(57) ABSTRACT

A method for configuring a large hybrid memory subsystem having a large cache size in a computing system where one or more performance metrics of the computing system are expressed as an explicit function of configuration parameters of the memory subsystem and workload parameters of the memory subsystem. The computing system hosts applications that utilize the memory subsystem, and the performance metrics cover the use of the memory subsystem by the applications. A performance goal containing values for the performance metric is identified for the computing system. These values for the performance metrics are used in the explicit function of performance metrics, configuration parameters and workload parameters to calculate values for the configuration parameters that achieve the identified performance goal. The calculated values of the configuration parameters are implemented in the memory subsystem.

23 Claims, 4 Drawing Sheets

(56) References Cited

OTHER PUBLICATIONS

Gluhovsky et al. "Comprehensive Multiprocessor Cache Miss Rate Generation Using Multivariate Models." May 2005. ACM. ACM Transactions on Computer Systems. vol. 23. pp. 111-145.*

Martin et al. "Dynamic Reconfiguration Algorithm: Dynamically Tuning Multiple Buffer Pools." Jan. 2000. Springer Berlin. Lecture Notes in Computer Science. vol. 1873. pp. 92-101.*

B. McNutt. "I/O Subsystem Configurations for ESA: New Roles for Processor Storage." IBM. IBM Systems Journal. vol. 32. pp. 252-264.*

J. E. MacDonald and K. L. Sigworth. "Storage Hierarchy Optimization Procedure." Mar. 1975. IBM. IBM Journal of Research and Development. vol. 19. pp. 133-140.*

Anant Agarwal et al. "An Analytical Cache Model." May 1989. ACM. ACM Transactions on Computer Systems. vol. 7. pp. 184-215.*

Men-Chow Chiang and Gurindar S. Sohi. "Evaluating Design Choices for Shared Bus Multiprocessors in a Throughput-Oriented Environment." Mar. 1992. IEEE. IEEE Transactions on Computers. vol. 41. pp. 297-317.*

R. E. Matick. "Comparison of analytic performance models using closed mean-value analysis versus open-queuing theory for estimating cycles per instruction of memory hierarchies." Jul. 2003. IBM. IBM Journal of Research and Development. vol. 47. pp. 495-517.*

Alan Bivens et al. "Architectural Design for Next Generation Heterogeneous Memory Systems." May 2010. IEEE. IMW 2010. pp. 1-4.*

Bruce McNutt. "A Simple Statistical Model of Cache Reference Locality, and its Application to Cache Planning, Measurement and Control." Dec. 1991. Computer Measurement Group. CMG91. pp. 203-212.*

Parijat Dube et al. "Performance of Large Low-Associativity Caches." Mar. 2010. ACM. ACM SIGMETRICS Performance Evaluation Review. vol. 37. No. 4. pp. 11-18.*

Parijat Dube et al. "Performance Modeling and Characterization of Large Last Level Caches." Aug. 2012. ACM. MASCOTS '12. pp. 379-388.*

Parag Beeraka, "Maintaining cache coherence with amd opterons using fpgas", http://www.fermentas.com/techinfo/nucleicacids/maplambda.htm, Feb. 11, 2008.

Bingsheng He et al., "EaseDB: A Cache-Oblivious In-Memory Query Processor", SIGMOND '07, Jun. 12-14, 2007, 1064-1066.

Shih-wie Liao et al., "optimizing Memory System Performance for Data Center Applications via Parameter Value Prediction", ICS '09, Jun. 8-12, 2009.

Adam J. Storm et al., "Adaptive Self-tuning Memory in DB2", VLDB '06, Sep. 12-15, 2006, 1081-1092.

S. R. Kunkel and R. J. Elckemeyer and M. H. Lipasti and B. O'Krafka and H. Rosenberg and S. P. VanderWiel and P. L. Vitale and L. D. Whitley, "A Performance Methodology for Commercial Servers", IBM Journal of Research and Development, 44(6):851-872, Nov. 2000.

W. Wang and Q. Wang and W. Wei and D. Liu, "Modeling and Evaluating Heterogeneous Memory Architectures by Trace-driven Simulation", In 2008 workshop on Memory access on future processors: a solved problem?, May 2008.

Barroso et al., "Rpm: A rapid prototyping engine for multiprocessor systems", IEEE Computer, vol. 28, Issue 2, pp. 26-34, Feb. 1995.

Chung et al., "A complexity-effective architecture for accelerating full-system multiprocessor simulations using fpgas", In In Proceedings of 16th International ACMJSIGDA Symposium on Field Programmable Gate Arrays, pp. 77-86, Feb. 24-26, 2008, Monterey, California, USA.

Chung et al., "Protoflex: Towards scalable, full-system multiprocessor simulations using fpgas", ACM Transactions on Reconfigurable Technology and Systems (TRETS), vol. 2, Issue 2, Article 15, Jun. 2009.

Duato et al. "Scalable Computing: Why and How", hypertransport.org White Paper, http://www.hypertransport.org, Mar. 7, 2010.

University of Heidelberg. http://ra.ziti.uni-heidelberg.de/coeht/?page=projects&id=htcore_xilinx_port, Feb. 2, 2009.

Qureshi et al., "Scalabe high-performance main memory system using phase-change memory technology", In In Proceedings of International Symposium on Computer Architecture (ISCA), ACM SIGARCH Computer Architecture News vol. 37 Issue 3, pp. 24-33, Jun. 2009.

Thornock et al., "Facilitating level three cache studies using set sampling", In Proceedings of Winter Simulation Conference, pp. 471-479, Winter 2000.

D. Abts et al., "Achieving Predictable Performance through Better Memory Controller Placement in Many-Core CMPs", ISCA '09, Jun. 20-24, 2009.

A. J. Smith, "Cache memories", ACM Computing Surveys, 14(3):473-530, Sep. 1982.

N. Chalainanont, "Real-time 13 cache simulation using the programmable hardware assisted cache emulator (pha $e)", In Proceedings of Sixth Annual Workshop on Workload Characterization, Oct. 2003.

Lu and Lai, "Implementation of hw$im—a real-time configurable cache simulator", Field-Programmable Logic and Applications, Lecture Notes in Computer Science, 2778:638-647, Sep. 2003.

A. Nanda et al., "Memories: A programmable, real-time hardware emulation tool for multiprocessor server design", ACM SIGARCH Computer Architecture News—Special Issue: Proceedings of the ninth international conference on Architectural support for programming languages and operating systems (ASPLOS '00) Homepage vol. 28 Issue 5, pp. 37-48, Dec. 2000.

Eriko Nurvitadhi, Jumnit Hong, and Shih-Lien Lu, "Active cache emulator", IEEE Transactions on Very Large Scale Integration (VLSI) Systems, vol. 16, Issue 3 pp. 229-240, Feb. 2008.

* cited by examiner

System with Reconfigurable Memory Subsystem Tool

METHOD AND APPARATUS FOR OPTIMAL CACHE SIZING AND CONFIGURATION FOR LARGE MEMORY SYSTEMS

FIELD OF THE INVENTION

The present invention relates to computer memory subsystems.

BACKGROUND OF THE INVENTION

As processor performance continues to outgrow memory capacity and bandwidth, system and application performance has become constrained by the memory subsystem. As the processor community has moved to parallelism to stay on the performance curve, memory capacity and bandwidth are key to keeping the parallel processors and their cores operating efficiently. Promising new technologies, e.g., Phase Change Memory and Flash, have emerged that add capacity at a cheaper cost than conventional DRAM. These new technologies, however, result in added latency and exhibit poor endurance. Systems leveraging these new memory technologies in the memory subsystem will require innovative memory system architectures to gain the benefit of added capacity while mitigating the costs of latency and potential device wear-out.

These sophisticated, high capacity memory systems require long-term application knowledge to effectively evaluate the trade-offs in architecture design decisions. One common method for obtaining the desired application knowledge uses system trace data from a running application to determine read and write patterns of the application. However, these traces can be prohibitively large for even the smallest time scale and often impact the running of the application itself. Furthermore, to understand how an application would leverage a large memory system, the system needs to be monitored or traced for a long time as the application runs. Some designers use modeling and simulation with synthetic memory access patterns to evaluate design decisions. These methods run the risk of not being as accurate as needed.

Traditionally, the architecture design or memory configuration was fixed for a given system. There have not been sufficient capabilities to merit the complexities likely introduced by dynamically reconfiguring the operation of the memory. However, with recent developments enabling more diverse memory subsystems that integrate memory components of different nature into the memory subsystem in combination with more diverse behavior of application workloads, different architectures and memory configurations are now viewed as beneficial. These different architectures include larger memory caches. Technology trends are enabling last level caches that are significantly larger than those that currently exist.

The performance of the memory subsystem directly affects the performance of applications utilizing the memory subsystem. Memory subsystem performance depends on workload parameters and configuration parameters, i.e., architecture, of the memory subsystem. The memory subsystem configuration parameters include e.g., cache size, memory size, line size, block size and associativity. Identifying and quantifying this dependence using performance models helps in understanding the performance of memory subsystem and application performance dependence on memory subsystem configuration parameters. This understanding of dependence and performance provides guidelines for setting memory subsystem configuration parameters for a target application or set of applications.

Traditionally, cache effectiveness has been modeled through trace-driven simulation tools. In addition to the shortcomings of trace-driven simulations as described above, these tools are not up to the task of simulating very large caches. Typical cache sizes modeled using trace driven simulations are of the order of MBytes. Because of the limited length of available traces, the tools cannot capture behavior across long enough periods of time. Apart from the limitations of trace-driven simulations, the performance models that connect memory subsystem performance to configuration parameters are quite limited. These performance models lack an explicit functional characterization and only make available some observations from experiments. Extrapolation from empirical data based on these observations produces a variety of problems including limited extrapolation, usually with respect to single configuration parameter, the requirement for a large number of runs with several different configuration parameters, difficulty in capturing the inter-dependence of different performance metrics, difficulty in capturing fine grained sensitivity of performance metrics to changes in configuration parameters and difficulty in characterizing the robustness of performance to configuration parameter settings.

SUMMARY OF THE INVENTION

Exemplary embodiments of the present invention are directed to methods and apparatus for configuring and dynamically reconfiguring the arrangement and operation of a memory or memory subsystem based on measurements collected during operation of the computing system containing the memory subsystem. Memory operation and performance data are dynamically collected, analyzed and correlated with application performance data to determine the desired or optimum memory configuration for a given context based on a desired evaluation method.

In one embodiment, systems and methods in accordance with the present invention dynamically adjust the structure of the memory operation to the needs of the applications running on the system. The present invention provides a methodology for quantifying dependence of memory subsystem and application performance on memory subsystem configuration and workload specific parameters. Explicit functional characterization of this dependence is used for predictive performance of systems. In addition, the functional characterization of this dependence is used for memory subsystem configuration parameter setting for a target application or set of target applications to optimize some performance objective.

In accordance with one exemplary embodiment, the present invention is directed to a method for configuring a memory subsystem of a computing system. This method can be executed during design and creation of the memory subsystem or during run time of the computing system. In order to configure the memory subsystem, at least one performance metric of the computing system is expressed as an explicit function of configuration parameters of the memory subsystem and workload parameters of the memory subsystem. The computing system hosts applications that utilize the memory subsystem, and in one embodiment, the memory subsystem has a capacity of at least about 10 gigabytes. Suitable memory systems include hybrid memory systems, for example, containing two distinct types of memory selected from the group consisting of static random access memory, dynamic random access memory, phase change memory, NAND flash memory and NOR flash memory. In one embodiment, the memory subsystem includes a cache, and the workload parameters include load on the cache, temporal correlation within the cache, spatial correlation within the cache and combinations thereof.

In one embodiment, the configuration parameters include hardware parameters, software parameters and combinations thereof. In addition, the memory subsystem can include a cache and a main memory portion separate from the cache, and the hardware parameters include cache size, total memory size, line size within the cache, block size within the main memory portion, associativity within the cache and combinations thereof. In one embodiment, the software parameter includes a replacement algorithm.

In one embodiment in order to express the performance metrics as an explicit function, system performance statistics are connected to the system performance metrics, and this connection is used to develop the explicit function. These system performance metrics include a miss ratio containing a ratio of misses to a memory subsystem cache to hits to the memory subsystem cache. In one embodiment, the memory subsystem includes a cache, and the system performance statistics include cache performance statistics. These cache performance statistics include cache residency time, single residency time, inter-hit time and combinations thereof.

In one embodiment, expressing the performance metrics as an explicit function includes collecting histogram data for system performance statistics on the operation of the computing system for a plurality of different arrangements of the configuration parameters and processing the collected histogram data to estimate an empirical density for each arrangement of the configuration parameters. The histogram data is collected from the computing system during runtime or, alternatively, the histogram data is collected from a memory subsystem cache simulation of the computing system. In one embodiment, collection of the histogram data includes collecting the histogram data over different time ranges and at varying granularity. An empirical density for each arrangement of the configuration parameters can be used to establish a parametric density function for the different arrangements of the configuration parameters. In one embodiment, a dependence of density parameters in the parametric density function on the configuration parameters is determined and is used to determine the explicit function between performance metrics and configuration parameters.

This embodiment of the method of the present invention also includes identifying a performance goal for the computing system. The performance goal includes values for the performance metrics. In one embodiment in order to identify a performance goal for the computing system further, the explicit function is used to determine mean, standard deviation and higher order moments of the performance metrics in terms of the configuration parameters. These values for the performance metrics are used in the explicit function of performance metrics, configuration parameters and workload parameters to calculate values for the configuration parameters that achieve the identified performance goal. In one embodiment, using the values for the performance metrics to calculate values for the configuration parameters includes using the mean, standard deviation and higher order moments to identify a preferred set of configuration parameters for the identified performance goal. The calculated values of the configuration parameters are then implemented in the memory subsystem.

DETAILED DESCRIPTION

Figure 1:
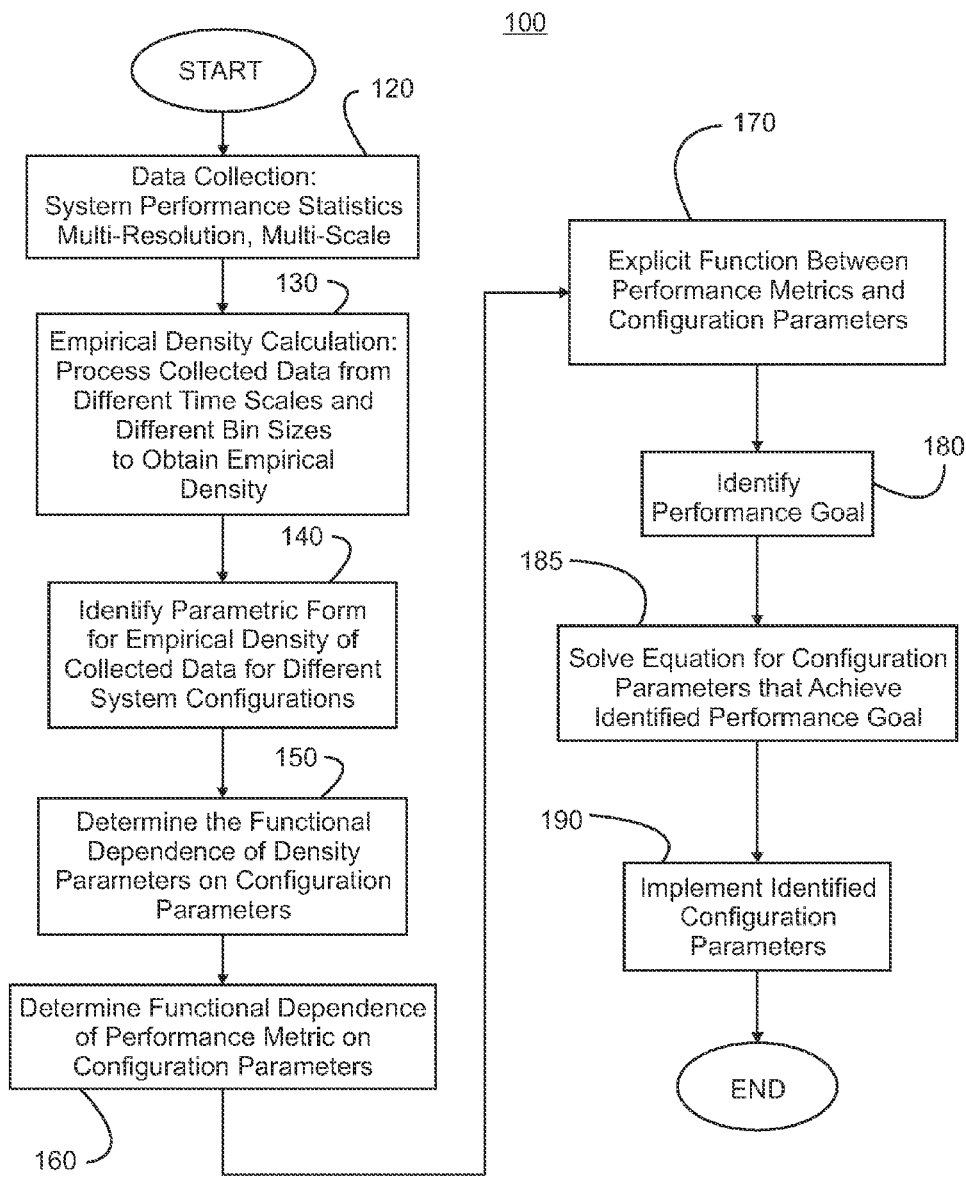
FIG. 1 is a flow chart illustrating an embodiment of a method for configuring a memory subsystem of a computing system in accordance with the present invention.

Exemplary embodiments of systems and methods in accordance with the present invention utilize parametric distribution fitting for different configuration data in order to derive a functional relationship between system configuration parameters and system performance metrics in a computing system. Parametric probability density and distribution functions are fit using histogram data for different performance metrics quantifying cache dynamics. In one embodiment, the cache is a last level cache associated with a memory or memory subsystem of a computing system. These different performance metrics include, but are not limited to, cache residency time, single residency time and inter-hit time. The probability density and distribution functions are also fit for different system configuration settings in various experiments or system configuration simulations.

Statistical regression is used to characterize changes in distribution parameters with changes in configuration parameters. The changes in model parameters due to change in configuration parameters, e.g., line size, cache size and associativity, are quantified using statistical regression techniques. As used herein, associativity is a characteristic of cache memory related directly to its logical segmentation as is understood by one of skill in the art. At least one performance metric such as cache performance metrics is expressed in terms of computing system configuration parameters such as cache configuration parameters and workload specific parameters. The performance models obtained from the methodology of the present invention are used to characterize application level computing system performance in terms of configuration parameters including memory subsystem configuration parameters and to identifying the best set of computing system configuration parameters for a target set of applications and application workload.

Exemplary embodiments of systems and methods in accordance with the present invention utilize performance models that provide explicit dependence of memory and application performance on memory subsystem configuration parameters. Compared to models doing simple regression on empirical data, the models of the present invention use empirical data to obtain a probability distribution for different metrics describing cache dynamics, which are useful for studying second order statistics of cache behavior analytical models connecting different cache parameters. The present invention provides a model based optimal configuration of memory parameters for a system with a target set of applications and application workload, which is a more efficient system performance compared to rule of thumb type approaches. The predictive performance models of the present invention assist in what-if type performance analysis, for example, what if cache size is increased by X %, what if line size is 1 KByte instead of 128 Byte or what if cache is 4-way associative instead of direct mapped. The present invention also provides for memory subsystem scalability analysis by looking at performance degradation due to increased load and providing for performance extrapolation for configurations that cannot be simulated due to resource constraints, e.g., hardware, time or storage.

Referring initially to FIG. 1, an exemplary embodiment for configuring a computing system including configuring the memory subsystem of a computing system 100 in accordance with the present invention is illustrated. In one embodiment, configuration of the memory subsystem can be executed during the manufacture or creation of the memory subsystem of the computing system. Alternatively, the computing subsystem is configured or reconfigured dynamically during the operation or runtime of the computing system containing the memory subsystem. Suitable computing systems include, but are not limited to, a complete working computer or any arrangement of a plurality of working computers or servers that can be configured, for example, in a distributed computing environment. The computing system includes hardware devices such as processors, drives, storage devices and memory subsystems, software, including operating systems and applications, and peripheral devices, for example routers and switches in a distributed computing system.

The memory or memory subsystem includes homogenous memory subsystems that contain a single type of memory and heterogeneous memory subsystems that include two or more different types of memory in a single memory subsystem. The heterogeneous memory subsystems include hybrid memory systems. Suitable types of memory include static random access memory (SRAM), dynamic random access memory (DRAM), phase change memory (PCM), NAND flash memory and NOR flash memory. The memory subsystems used in the present invention have a very large capacity that is significantly larger than conventional memory subsystems. The memory system is divided into a main memory portion and a cache. In one embodiment, the cache is a last level cache within the computing system.

In one embodiment, systems and methods in accordance with the present invention determine the desired ratio of the size of the cache to the size of the main memory portion of the memory subsystem in order to meet a prescribed performance goal in the computing system, for example application level computing system performance. This ratio can range, for example, from about 1 to 80 to about 1 to 8. In one embodiment, the memory subsystem has a capacity of at least about 10 gigabytes, and the cache has a size of at least about 128 Mbytes.

When the memory subsystem is a hybrid memory system, the memory subsystem includes two distinct types of memory selected from the group consisting of DRAM, SRAM, phase change memory, NAND flash memory and NOR flash memory. In one embodiment, the type of memory chosen for the cache and for the main memory portion is based on the performance characteristics and cost of each type of memory. For example, a faster but costly memory such as DRAM is selected as a cache for a slower but cheaper memory such as a solid state memory like NAND flash, NOR flash and PCM. Therefore, these memory subsystems are a hybrid of two different memory technologies, exploiting the cost effectiveness and non-volatility of solid state memory devices with the speed of traditional DRAM.

In order to study the performance tradeoffs with the hierarchical memory architectures used in the present invention, the effect of having a last level cache that is much larger than the last level caches in existing systems is evaluated. This large cache filters out references going to the slower but larger solid state memory. Thus the miss ratio, i.e., a ratio of misses to the memory subsystem cache to hits to the memory subsystem cache, of this large cache is an important metric. In addition, the bandwidth between the main memory portion and the cache, and in particularly its burstiness, is a significant overhead. Therefore, apart from metrics quantifying average performance of the cache, statistics characterizing the temporal dynamics of large caches need to be studied as well. This characterizes the access pattern of references to memory, which in turn can be used to model the bandwidth usage between the large cache and memory.

In accordance with the present invention, at least one performance metric of the computing system hosting applications that utilize the memory subsystem is expressed as an explicit function of configuration parameters of the memory subsystem and workload parameters of the memory subsystem. Suitable configuration parameters include, but are not limited to, hardware parameters, software parameters and combinations thereof. The hardware parameters govern the configuration of the hardware components of the computing system and include cache size, total memory size, line size within the cache, block size within the main memory portion, associativity within the cache and combinations thereof. The software parameters govern the configuration of software that controls the operation and use of the computing system resources including the memory subsystem. These software parameters include a replacement algorithm for entries in a cache such as least recently used (LRU) or random replacement.

Suitable workload parameters for the computing system include, but are not limited to, load on the cache, temporal correlation within the cache, spatial correlation within the cache and combinations thereof. The load on the cache monitors the arrival of request to the cache. The temporal correlation looks at how cache requests are correlated in time. For example, if a given line is accessed, then a high probability exists that the same line will be accessed again within a given time frame. The spatial correlation looks at how cache requests are correlated spatially to lines within the cache. For example, if a given line is accessed, then a high probability exists that lines close to the accessed line will be accessed within a given time frame.

The system performance metrics include, but are not limited to a miss ratio, which is a ratio of misses to a memory subsystem cache to hits to the memory subsystem cache and cache performance statistics, including cache residency time, single residency time, inter-hit time or combinations thereof. Cache residency time is measured from the time a line is fetched from the main memory portion to the cache to the instance that line gets evicted from the cache. Single residency time is measured from the last hit to a line already present in the cache to the instance that line get evicted from the cache. Inter-hit time is defined as the time between consecutive hits to a line in the cache following a miss.

In one embodiment, data covering each one of these three performance statistics can be collected over three different time ranges with different granularity. The lower-range covers data following in the range from 0 to 163.84 μs, i.e., the range is divided into 4K buckets each with a width of 40 ns. The mid-range covers data following in the range from 0 to 671.089 ms, i.e., the range is divided into 4K buckets each with a width of 163.84 μs. The upper-range covers data following in the range from 0 to 42.95 sec, i.e., the range is divided into 1K buckets each with a width of 41.94 ms with the last bucket containing data with numbers greater than 42.95 sec.

In one embodiment, in order to express the performance metrics as an explicit function of configuration parameters and workload parameters, system performance statistics are connected to the system performance metrics. This connection is used to develop of desired explicit functional relationship between system performance metrics and system configuration parameters. The system performance statistics, i.e., data on system performance, can be gathered from the operation or performance of different configurations of an actual memory subsystem operating with an actual computing system. Alternatively, the system performance statistics are gathered from simulations of the operation of the large memory subsystem and large cache.

Figure 2:
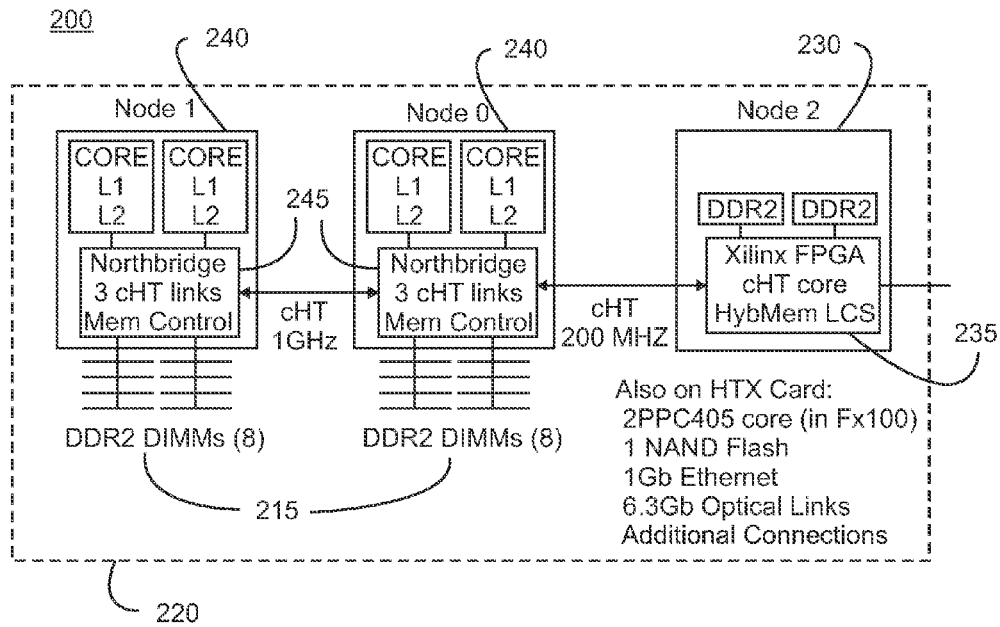
FIG. 2 is a schematic representation of an embodiment of a large cache simulation system for use in providing system performance statistics

In one example to generate system performance statistics from a large memory subsystem simulation, a field programmable gate array (FPGA) based large cache simulation is used to produced the desired system performance statistics. Referring to FIG. 2, a simulation system 200 is constructed on an IBM® System x® x3655 server 220 model 7985, which has two processor nodes 240 that are conventionally AMD Opteron™ 2216 dual-core central processing unit (CPU) chips. The system uses a HyperTransport Extension (HTX) bus connector. The processor nodes 240 in the base system were modified by replacing each 2000 series AMD Opteron™ with an 8218 AMD Opteron™ as these support three coherent HyperTransport (cHT) links 245. Each node also includes double data rate (DDR2) dual in-line memory modules (DIMMS) 215. The IBM® x3655 Model 7985 BIOS (c2e131a) is modified to support a special 3NodeSerial cHT configuration and routing table. The HTX slot 230 is populated with an HTX FPGA card 230 made by the HyperTransport Center of Excellence of the Computer Architecture Group at the Department of Computer Engineering, University of Heidelberg. The HTX FPGA includes a cHT FPGA core_235 to emulate a hybrid memory with a large cache, i.e., a large cache simulator (LCS). A cHT FPGA core is obtained under license from AMD.

Figure 3:
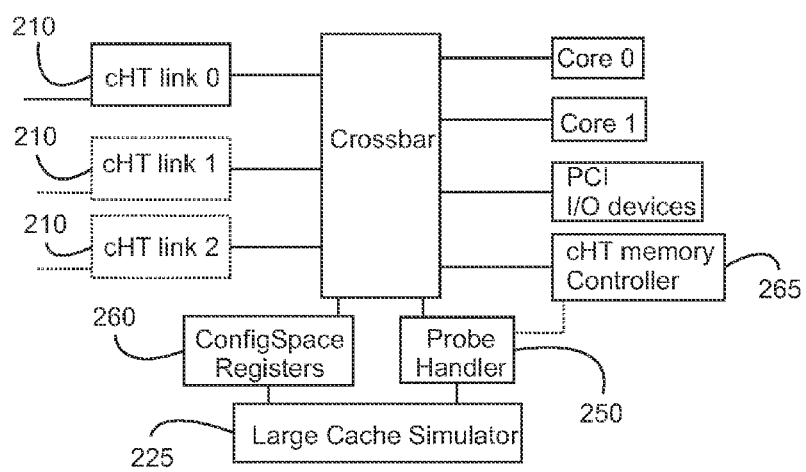
FIG. 3 is a schematic representation of an embodiment of top level data flow from probe handlers to configuration registers in the large cache simulator.

As illustrated in FIG. 3, the cHT FPGA core is modified to connect the LCS 225 to the cHT Probe Handlers 250 and ConfigSpace Registers 260. In the 82xx AMD Opteron™ CPU, whenever there is an access to the on-chip Memory Controller 265, a cHT Probe Packet is send out on the cHT links 210 to all the coherent nodes. The cHT FPGA Probe Handler first accepts the probe packet and then replies with an "invalid" Probe Response. The Probe Handler is modified to forward a copy to the LCS logic. The probe address is used to access a simulated cache directory, where the active cache tags are maintained. The condition of "cache hit" or "cache miss" can thus be obtained. An additional storage element is also attached to each of the cache directory entries, to gather additional information or statistics for each directory entry. In the current example, a timestamp of the probe packet arrival is maintained to collect the residency time of each cache entry. With these facilities in place, a variety of cache configurations can be implemented for different cache line sizes, different total cache sizes, direct mapped caches and multi-way set associative caches among other arrangements.

In this example, the probe packets arrive at the FPGA every 4 FPGA clock cycles; therefore, updates to the simulated cache directory are completed in 4 cycles as well. Although much of the probe address pre- and post-processing can be handled with a pipelined FPGA design, the inner loop of cache tag look-up, followed by tag update, is an extremely timing-critical operation. This timing constraint limits the complexity of the simulated cache directories to those that can be safely implemented within 4 FPGA clock cycles. The FPGA has a finite amount of on-chip memory resources to store the cache tags, which limits the cache sizes that can be simulated. By pre-processing the received probe addresses to select only a sub-set of all possible addresses, a "Set Sampling" mechanism is also implemented. This enables the emulation of a much larger cache than the basic FPGA resources can allow. Set sampling identifies a subset of cache sets and monitors the performance of that subset of sets. Assuming the sets are representative of the entire cache, the performance numbers from set sampling are used as numbers for the entire cache. Set sampling is effective in providing good performance estimates.

The FPGA maintains a cache directory with a fixed number of entries equal to 64000 entries. The cache line size is varied from 128 B to 16 KB to simulate a cache of different size with different line size. If the cache directory has M number of entries, than the cache size simulated with cache line size L Bytes is M×L Bytes. Experiments were first performed with 32K and 64K sets in cache with different line sizes. To simulate caches larger than 64K sets, two-bit and four-bit set sampling was implemented. In a two-bit (four-bit) set sampling implementation, two (four) bits are masked from the address bits with a fixed two (four) bit pattern. The FPGA now simulates a subset of sets from an effective 256K (1M) directory cache. Different two (four) bits patterns and different positions of the two (four) bits to be masked are chosen. The goal is to get cache performance data that is representative of the true 256K (1M) set cache.

Table I illustrates the different combinations of line sizes and cache sizes used in this example. While FPGA can model set-associative caches, only results for direct-mapped configuration are reported due to the fact that the last level caches that are contemplating are very large (>>10 GBs). It is prohibitive to have associativity in such large caches due to the amount of directory space required.

TABLE I

Simulated Cache Sizes in the FPGA Prototype by Changing Line Sizes for Different Directory Sizes

| Line Size (Bytes) | Simulated Cache Sizes | | | |
|---|---|---|---|---|
| | 32K Directory | 64K Directory | 256K Directory (Set Sampling) | 1M Directory (Set Sampling) |
| 128 | 4 MB | 8 MB | 32 MB | 128 MB |
| 256 | 8 MB | 16 MB | 64 MB | 256 MB |
| 512 | 16 MB | 32 MB | 128 MB | 512 MB |
| 1024 | 32 MB | 64 MB | 256 MB | 1 GB |
| 2048 | 64 MB | 128 MB | 512 MB | 2 GB |
| 4096 | 128 MB | 256 MB | 1 GB | 4 GB |
| 8192 | 256 MB | 512 MB | 2 GB | 8 GB |
| 16384 | 512 MB | 1 GB | 4 GB | 16 GB |

The target systems for the exemplary embodiment are enterprise level dealing with commercial workloads with performance constrained by memory. The performance modeling and analysis activities were concentrated around three commercial workloads of interest. The first benchmark (B-SE) is a web search application against a 2 GB database index with three query streams. The second benchmark (B-DB) is a database workload running with 3 SQL streams against a representative 4 GB DB2 database. The third benchmark (B-S J) is the SpecJbb, running with all eight warehouses. The details of each experiment for different benchmarks are provided in Table II, which lists the average length of each run and the average number of probes generated in each run.

TABLE II

DETAILS OF FPGA EXPERIMENTS FOR DIFFERENT BENCHMARKS

| Benchmark | Average Run Time (sec) | Number of FPGA Probes in Billions | Probe Rate (probes/msec) |
|---|---|---|---|
| B-SE | 365.28 | 4.51 | 12.4 |
| B-DB | 86.34 | 1.17 | 13.6 |
| B-SJ | 1299.66 | 21.98 | 17.07 |

Returning to FIG. 1, multi-resolution and multi-scale system performance statistics or data are collected 120 using either runs from an actual computing system or a simulated system, for example the FPGA based large cache simulation system described above. In one embodiment, the system performance statistics are gathered as histogram data. A histogram is generated for a plurality of runs of cache size and line size within the cache. Therefore, histogram data for system performance statistics on the operation of the computing system are collected for a plurality of different arrangements of the configuration parameters. In one embodiment, the histogram data are collected from the computing system during runtime of the computing system. Alternatively, the histogram data are collected from a memory subsystem cache simulation of the computing system, for example as described above. In one embodiment, the histogram data are collected over different time ranges and at varying granularity. This provides a multi-resolution and multi-scale collection of data.

Having collected the histogram data, these data are processed to estimate an empirical density for each arrangement of the configuration parameters 130. Suitable methods for determining the empirical density from histogram data are known and available in the art. The histogram data are processed from different time scales with different bin sizes to obtain the empirical density. In general, the empirical density of the histogram data expresses the probability that the value of a given system performance statistic falls between a given set of values.

In order to move from the density function to an explicit dependence between system performance and system configuration, the empirical density for each arrangement of the configuration parameters is used to establish a parametric density function for the different arrangements of the configuration parameters 140. From the parametric density function, a functional dependence between the density parameters in the parametric density function and the configuration parameters is determined 150. It is this dependence that is used to determine the density function of the system performance metrics as a function of the configuration parameters 160. Then the explicit function between performance metrics and configuration parameters is determined 170.

In the example embodiment, the simulation data are used in the determination of the explicit function between system performance metrics and system configuration parameters. In the example, data are collected to determine the performance metric of miss ratio on the configuration parameters of the cache, for example, the size of the cache. The performance statistics for which data are collected are the mean cache residency time for any line, $T_{crt}$ the mean single residency time, $T_{srt}$, and the mean inter-hit residency time, $T_{iht}$. These performance statistics depend on system configuration. In order to determine the explicit dependence of the desired performance metric, i.e., miss ratio, on the system configuration parameters, the dependence of the performance statistics, $T_{crt}$, $T_{srt}$ and $T_{iht}$ on the system configuration parameters is determined. The experimental simulation generated histogram data for the system performance statistics for different system configurations or cache configurations. The density function of these system performance statistics is determined for each experimental configuration, and the sensitivity of the parameters in the density function to the systems configuration parameters of cache size and line size is determined.

The empirical density for different system configurations for these system performance statistics has a heavy tail, suggesting their modeling using functions having such form. Any cache performance metric, p, for a workload, w, is modeled as a random variable $X_{p,w}$, where p can be the cache residency time, the single residency time or the inter-hit time. The probability density function of any metric p for any workload w is denoted by the function $f_{p,w}(x)$, and a parametric form for $f_{p,w}$ is identified using the histogram data. For each benchmark, different families of parametric density functions are tried to best fit the histogram data using the Maximum Likelihood Estimator (MLE). The gamma density function and the shifted power-law density function are identified as the two candidate functions that closely model the empirical density.

The gamma density function is defined as:

$$f_{p,w}^g(x) = \frac{x^{\alpha_{p,w}-1}\exp(-x/\beta_{p,w})}{\beta_{p,w}^{\alpha_{p,w}}\Gamma(\alpha_{p,w})} \quad (4)$$

such that, $$\int_0^\infty f_{p,w}^g(x)dx = 1$$

The shifted power low density function is defined as:

$$f_{p,w}^{spl}(x) = a_{p,w}(x+b_{p,w})^n,$$

$$\int_0^T f_{p,w}^{spl}(x)dx = 1, T=42.95\text{sec}. \quad (5)$$

The shifted power law was truncated at T=42.95 sec because the last bucket in the histogram contains data with time greater than 42.95 sec and has almost zero mass for any p and w. While gamma density has an exponential decay and captures this effect, shifted power law has a slowly decaying heavy tail, and truncation ensures a finite value for moments of cache residency time.

For both the density functions, two parameters need to be estimated. For gamma density the parameters are α and β, and for the shifted power law the parameters that need to be estimated are b and n as a can be expressed in terms of b and n as follows:

$$\int_0^T f_{p,w}^{spl}(x)dx = 1 \Rightarrow a_{p,w} = \frac{n+1}{(T+b)^{n+1} - b^{n+1}}.$$

In addition, the parameters ($\alpha_{p,w}$, $\beta_{p,w}$) in equation (4) and ($\alpha_{p,w}$, $\beta_{p,w}$) in equation (5) for a given p and w depend on the system configuration parameters s and z. Results of fitting the two density functions to different cache statistics are provided. Since the density functions have heavy tails, the cumulative complementary distribution function (ccdf) is plotted for better visualization of the tail behavior. The ccdf for any random variable, X with distribution G(.) at point x is defined as the probability of X taking values greater than x, i.e., P(X>x)=1−G(x).

For the ccdf of cache residency time estimated from the empirical data and obtained through the parametric density fits to the FPGA for B-SE with line sizes 128 B, 512 B and 4

KB, gamma density matches well for 99 percentile of the data, i.e., up to x such that P(CRT)>x=0.01. However, gamma density has an exponential tail that sharply decays for large values of CRT and does not match well the tail end of the data. Shifted power law density has a power law tail (truncated at T) and mostly gives higher probability to tail values as compared to empirical data. Thus, mean CRT calculated using shifted power law density will be an overestimate of the actual value. While different benchmarks are observed to all have a power law type distribution for CRT, there is no single distribution that fits the three benchmarks for all the configurations. For B-DB and large line sizes (>2 KB), gamma law captures the tail behavior better than shifted power law. For B-SE, shifted power law captures the tail better for all different line sizes. For B-SJ, gamma law captures the tail better for all line sizes except the 16 KB line size, which is well modeled by the shifted power law.

While both gamma and shifted power law match the empirical data well for about 99 percentile of the data for single residency time, the shifted power law matches the tail behavior better than gamma, which decays rapidly. For the inter-arrival time of hits, shifted power law is a very bad fit for the tail, and gamma law is a better fit. From the density function, the mean values can be derived as:

$$E[X_{p,w}(s,z)] = \begin{cases} \alpha_{p,w}\beta_{p,w} \\ \frac{a_{p,w}}{n_{p,w}-1}\left[\frac{(T+b_{p,w})^{2-n_{p,w}} - b_{p,w}^{(2-n_{p,w})}}{(n_{p,w}-2)} - T(T+b_{p,w})^{(1-n_{p,w})}\right] \end{cases} \quad (6)$$

Where the top equation is with gamma density, and the bottom equation is with shifted power law density.

To establish the goodness of fit for the density functions, the mean values calculated using the two density functions (6) are compared with the mean calculated using histogram data. Since shifted power law is a very poor fit for IHT distribution, only gamma density is considered for IHT. For all the three statistics, gamma density matches the empirical mean very closely. Shifted power law works well for smaller line size, i.e., up to 4 KB, but grossly over-estimates the mean values for larger line size. This is due to the fact that shifted power law has a slower decaying tail compared to gamma law.

The mean values from the density functions are used to obtain the miss ratio. Since shifted power law results in larger mean cache residency time, the resulting miss ratio is lower than the actual measured miss ratio when comparing the miss ratio obtained from the models and the measured miss ratio using FPGA counters.

Therefore, the error with gamma law is significantly lower than with shifted power law for the mean values of cache statistics. Since the miss rate in the models is related to the mean values of cache statistics, the gamma density also matches well the FPGA measured miss rates for all different configurations for the three benchmarks. Thus for miss rate projections, gamma law is the winner. To study higher order effects, higher moments of the two candidate fits and their match with empirical moments need to be evaluated to make a judgment. The goodness of fit also depends on the estimator used. Other estimators, e.g., Mean Square Error based, may converge to different values for the parameters. Since a common parametric form, i.e., gamma function, has been identified for the density of different cache statistics across the range of cache size and line size studied, the problem of isolating the dependence of these statistics on the configuration parameters boils down to isolating the dependence of the parameters in the density function of these statistics to the configuration parameters.

In the next step, the functional dependence of the density function parameters on the configuration parameters, i.e., cache configuration, is determined. Regarding the sensitivity of parameters $\alpha$ and $\beta$ of density function, $\alpha$ and $\beta$ values of CRT density as a function of the line size in a log-log scale for B-SE for a fixed number of entries in the cache, i.e., fixed s/z ratio, yield the existence of a near-linear dependence. Therefore, a power-law type relation exists between $\alpha(\beta)$ and line size for a fixed directory size. For $\alpha$ and $\beta$ values of CRT density as a function of the directory size for different line sizes for B-SE, a near-linear shape of the curve suggests a power-law type dependency on the directory size for a given line size. Similar trends are observed for SRT and IHT density parameters for B-SE. In addition, these trends are also observed with other two benchmarks. Therefore, the following functional dependency of the parameters $\alpha$ and $\beta$ on cache size and line size for any statistics and workload is conjectured:

$$\alpha = \psi_\alpha \left(\frac{s}{z}\right)^{\gamma_\alpha} z^{\theta_\alpha} \quad (7)$$

$$\beta = \psi_\beta \left(\frac{s}{z}\right)^{\gamma_\beta} z^{\theta_\beta} \quad (8)$$

where, s is cache size in KBytes, z is line size in Bytes and $\psi_\alpha$, $\psi_\beta$, $\gamma_\alpha$, $\gamma_\beta$, $\theta_\alpha$ and $\theta_\beta$ are constants independent of cache configuration and are dependent on the workload. The above relations hold for density parameters for any statistics (CRT, IHT or SRT).

Tables III and IV show the estimated values of these constants obtained by applying non-linear regression to fit functional form equations (7) and (8) to $\alpha$ and $\beta$ values inferred above for CRT. To quantify the goodness of fit, the regression hyperplane generated using equations (7) and (8) with the inferred $\alpha$ and $\beta$ values is compared for B-DB and B-SJ.

TABLE III

CONSTANTS IN EQUATION (7) FOR CRT

| Benchmark | $\psi_\alpha$ | $\gamma_\alpha$ | $\theta_\alpha$ |
|---|---|---|---|
| B-SE | 14.9280 | −0.2590 | −0.3548 |
| B-DB | 1.8262 | −0.0224 | −0.1637 |
| B-SJ | 6.5450 | −0.2619 | −0.2381 |

TABLE IV

CONSTANTS IN EQUATION (8) FOR CRT

| Benchmark | $\psi_\beta$ | $\gamma_\beta$ | $\theta_\beta$ |
|---|---|---|---|
| B-SE | 0.0013 | 2.0853 | 1.2712 |
| B-DB | 0.1567 | 1.3998 | 1.2180 |
| B-SJ | 0.3193 | 1.7417 | 0.7951 |

Having expressed the density of CRT in terms of configuration parameters, the explicit expressions for cache performance are determined. The mean and variance of gamma density are given by $\alpha\beta$ and $\alpha\beta^2$ respectively. From equations (7) and (8), the following functional form for mean CRT is obtained:

$$T_{crt} = \psi_\alpha \psi_\beta s^{\gamma_\alpha + \gamma_\beta} z^{\theta_\alpha + \theta_\beta - \gamma_\alpha - \gamma_\beta}. \quad (9)$$

Table V shows the formulae for the mean and variance of CRT in terms of cache size and line size. Further substituting equation (9) into equation (1), a generic explicit relation connecting miss ratio to cache size and line size for different workloads is obtained:

$$m = \frac{s^{1-(\gamma_\alpha+\gamma_\beta)} z^{-(1+\theta_\alpha+\theta_\beta-\gamma_\alpha-\gamma_\beta)}}{\psi_\alpha \psi_\beta r_w}. \tag{10}$$

Where $r_w$ is the rate of arrivals to cache requests (misses from the cache preceding the large cache) that is independent of the cache configuration. Table VI shows the relation between the normalized miss ratio $m/r_w$, line size and cache size for different workloads. For validation, the mean CRT obtained using the prediction model (equations in Table V) is compared with the measured mean CRT from FPGA. A pretty good match is obtained, establishing the applicability of the model

TABLE V

MEAN AND VARIANCE OF CRT FOR DIFFERENT WORKLOADS A FUNCTION OF LINE SIZE AND CACHE SIZE

| Benchmark | CRT Mean | CRT Variance |
|---|---|---|
| B-SE | $0.0194\, s^{1.83}\, z^{-0.91}$ | $0.0004\, s^{3.65}\, z^{-1.82}$ |
| B-DB | $0.2862\, s^{1.38}\, z^{-0.32}$ | $0.0819\, s^{2.75}\, z^{-0.65}$ |
| B-SJ | $2.0898\, s^{1.45}\, z^{-0.90}$ | $4.3673\, s^{2.91}\, z^{-1.79}$ |

TABLE VI

NORMALIZED MISS RATIO FOR DIFFERENT WORKLOADS AS FUNCTION OF LINE SIZE AND CACHE SIZE

| Benchmark | Miss Ratio |
|---|---|
| B-SE | $51.5294\, s^{-0.83}\, z^{-0.09}$ |
| B-DB | $3.4945\, s^{-0.38}\, z^{-0.68}$ |
| B-SJ | $0.4785\, s^{0.48}\, z^{-0.45}$ |

Returning to FIG. 1, having created the explicit function of the performance metrics and configuration parameters, a performance goal for the computing system is identified 180. Alternatively, a plurality of performance goals is identified. Each performance goal contains one or more values for the performance metrics. For example, a given performance goal can be a set of values for the performance metrics of the computing system. In one embodiment, identification of the performance goal for the computing system includes using the explicit function to determine mean, standard deviation and higher order moments of the performance metrics in terms of the configuration parameters The values for the performance metrics obtained from the performance goal are used in the explicit function of performance metrics, configuration parameters and workload parameters to calculate values for the configuration parameters 185. These values for the configuration parameters express a configuration of the computing system that will achieve the identified performance goal. Preferably, these values represent a best set of configuration parameters for the computing system to achieve the identified performance goal. In one embodiment, using the values for the performance metrics to calculate values for the system configuration parameters includes using the mean, standard deviation and higher order moments to identify a preferred set of configuration parameters for the identified performance goal.

Having solved the explicit function for values of the configuration parameters that will achieve the desired performance goal, the calculated values of the configuration parameters are implemented in the computing system and in particular in the memory subsystem 190. These values can be implemented automatically or autonomously by the computing system at runtime, can be manually implemented by a system administrator or can be implemented by a system designer during initial configuration of the computing system. Therefore the memory system is configured to meet the prescribed performance goals. This includes configuring the type of memories, overall size of the memory subsystem and size of the memory subsystem cache, among other factors.

Figure 4:
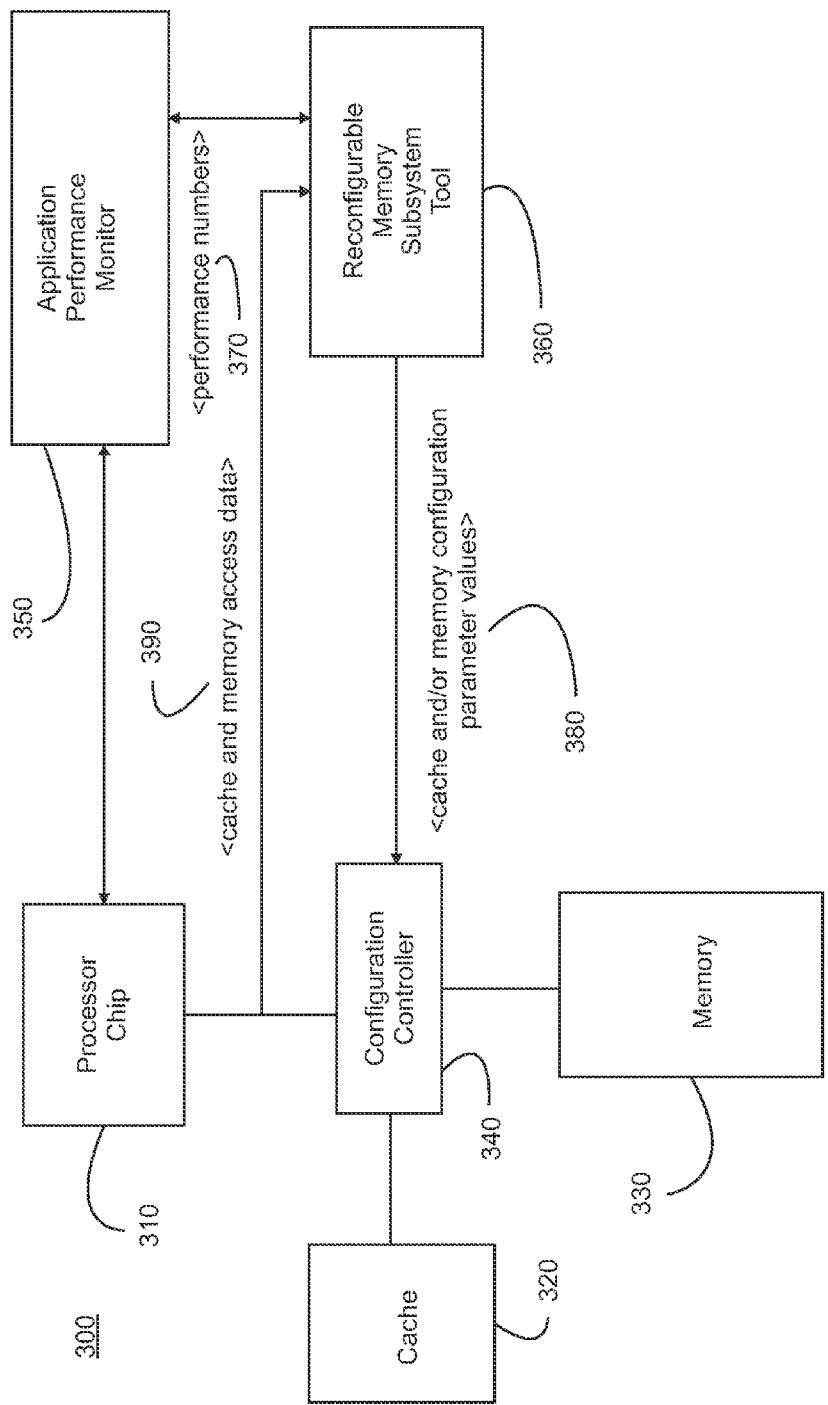
FIG. 4 is a schematic representation of an embodiment of a computing system containing a memory configuration subsystem tool in accordance with the present invention.

Referring to FIG. 4, an exemplary embodiment of a computing system with a reconfigurable memory subsystem 300 in accordance with the present invention is illustrated. The computing system includes a central processing unit 310 and a memory subsystem including a main memory portion 330 and a cache 320 in communication with the processing unit. The memory subsystem is a large memory system with a LCS as described herein. The computing system also includes a configuration controller 340 in communication with the processing unit 310, main memory 330 and cache 320. The configuration controller 340 is configured to modify the arrangement of the memory subsystem in accordance with the preferred system configuration parameters as determined by exemplary methods in accordance with the present invention. An application performance monitor 350 is provided in communication with the processor unit 310 and is configured to monitor system performance and to obtain performance numbers 370 for the computing system. The application performance monitor can be any application level performance monitoring tool that can be instrumented to directly interact with the other components of the computing system.

In the embodiment as illustrated, a subsystem tool 360 for the determination of configuration parameter values 380, i.e., system configuration parameters including cache and memory configuration parameters, in accordance with the present invention is illustrated. The subsystem tool 360 is in communication with the application performance monitor 350 and the configuration controller 340. In one embodiment, the subsystem tool 360 is embodied as a software component or application executing on components within the computing system. For example, the subsystem tool can be provided as firmware associated with one or more computing system components. In an alternative embodiment, the subsystem tool is separate from or external to the computing system. For example, the subsystem tool can be running on a separate computing system that is in communication across one or more networks with the computing system to be reconfigured. The subsystem tool receives cache and memory access data 390 in addition to the performance numbers 370. In one embodiment, the cache and memory access data are collected from the bus, for example by snooping the bus.

The subsystem tool 360 is configured to execute methods for determining system configuration parameters in accordance with the present invention based on cache and memory access data and the performance numbers. The subsystem tool 360 communicates the desired or optimal cache and memory configuration parameters 380 for a given workload and application level performance goal to the configuration controller 340. The configuration controller 340 implements the necessary changes to the current cache and memory configuration parameters that are necessary to implement the desired cache and memory subsystem configuration parameters 380. These changes include modifying the size or line size of the cache. The necessary changes are implemented during runtime of the computing system.

Figure 5:
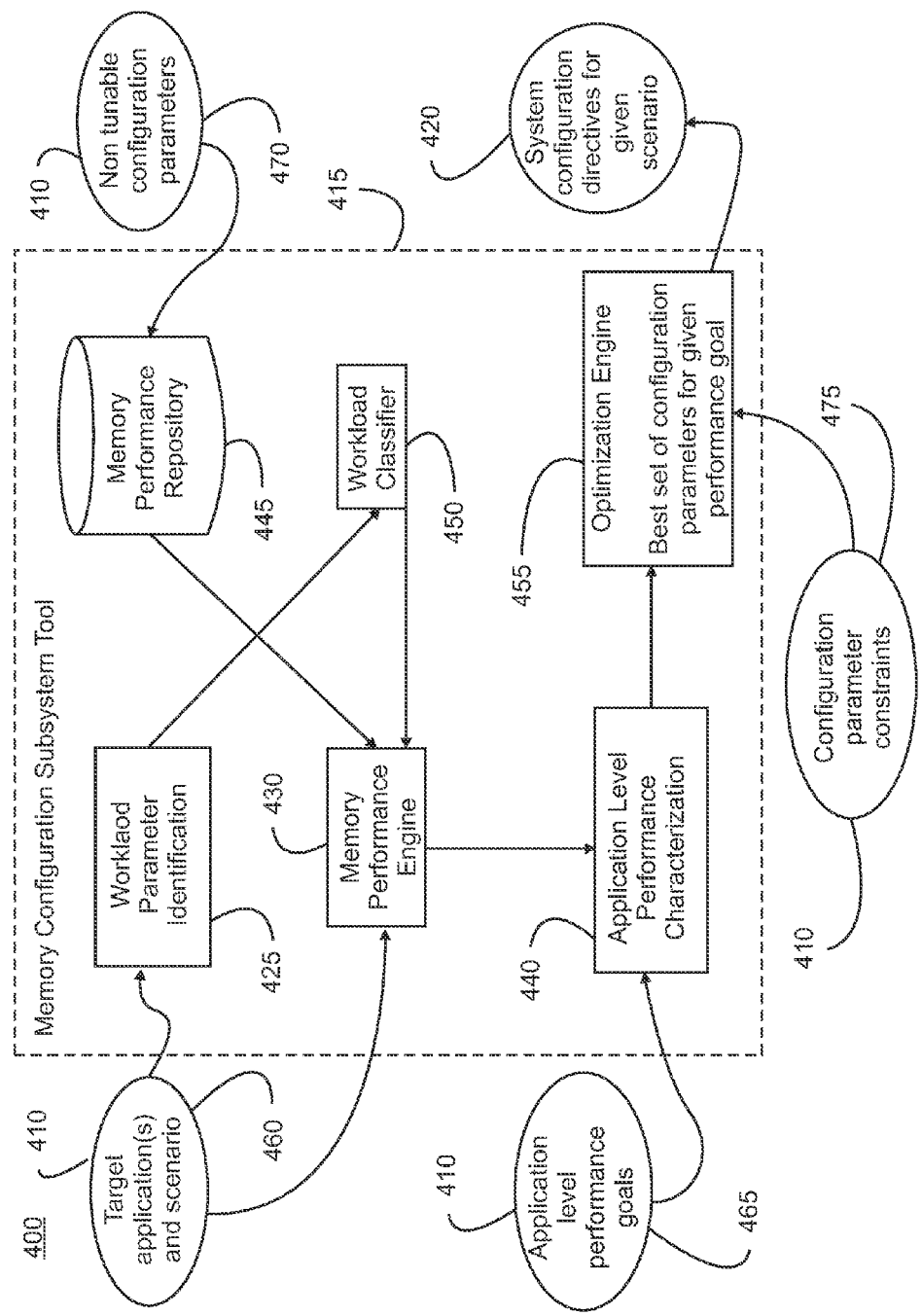
FIG. 5 is a schematic representation of an embodiment of a memory configuration subsystem tool of the present invention showing inputs and outputs to the subsystem tool.

Referring to FIG. 5, an exemplary embodiment of a system 400 to implement the computing system and memory subsystem configuration methods in accordance with the present invention is illustrated. A plurality of inputs 410 are provided to the memory configuration subsystem tool 415. The memory configuration subsystem tool 415 executes an embodiment of a method for configuring system and memory parameters in accordance with the present invention. The inputs 410 are derived from sources external to the memory configuration subsystem tool 415.

The memory configuration subsystem tool 415 includes a workload parameter identification element 425 for identifying the applications running on the computing system and the workloads generated by those applications. The target applications and scenarios 460 are provided as input to the workload parameter identification element. The memory configuration subsystem tool 415 also includes a workload classifier 450 in communication with the workload parameter identification element 425 and a memory performance repository 445. Input to the memory performance repository includes an identification of configuration parameters 470 that cannot be tuned or modified. Both the memory performance repository and the workload classifier are in communication with the memory performance engine 430. The memory performance engine uses the input from the memory performance engine, the workload classifier and the target applications and scenarios 460, i.e., workload and performance parameters, to generate the explicit function of configuration parameters on performance metrics.

This explicit function is communicated to an application level performance characterization element 440 that combines the equation with the application level performance goal inputs 465. An optimization engine 455 is used to solve the explicit function based on the identified performance goals and to derive the best set of configuration parameters for the desired performance goal. The optimization engine 455 also receives configuration parameter constraint inputs 475 that are taken into account when determining the best configuration parameters. The desired configuration parameters are output as system configuration directives 420 for a given input scenario.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, the present invention is directed to a machine-readable or computer-readable storage medium containing a machine-executable or computer-executable code that when read by a machine or computer causes the machine or computer to perform a method for configuring a memory subsystem of a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for configuring a memory subsystem of a computing system, the method comprising:
expressing performance metrics of the computing system hosting applications that utilize the memory subsystem as an explicit function of configuration parameters of the memory subsystem and workload parameters of the memory subsystem by:
collecting histogram data for system performance statistics of the computing system for a plurality of different arrangements of the configuration parameters;
using the histogram data to establish a parametric density function comprising a plurality of density parameters and the plurality of arrangements of the configuration parameters;
using the parametric density function to determine a density function of the performance metrics as a function of the configuration parameters; and
using the density function to determine the explicit function of the performance metrics, configuration parameters and workload parameters;
identifying a performance goal for the computing system, the performance goal comprising values for the performance metrics;
using the values for the performance metrics in the explicit function of performance metrics, configuration parameters and workload parameters to calculate values for the configuration parameters that achieve the identified performance goal; and
implementing the calculated values of the configuration parameters in the memory subsystem.

2. The method of claim 1, wherein the memory subsystem comprises a capacity of at least 10 gigabytes.

3. The method of claim 1, wherein the memory subsystem comprises a hybrid memory system.

4. The method of claim 3, wherein the hybrid memory system comprises two distinct types of memory selected from the group consisting of static random access memory, dynamic random access memory, phase change memory, NAND flash memory and NOR flash memory.

5. The method of claim 1, wherein the memory subsystem comprises a cache, and the workload parameters comprise load on the cache, temporal correlation within the cache, spatial correlation within the cache or combinations thereof.

6. The method of claim 1, wherein the configuration parameters comprise hardware parameters, software parameters or combinations thereof.

7. The method of claim 6, wherein the memory subsystem comprises a cache and a main memory portion separate from the cache, and the hardware parameters comprise cache size, total memory size, line size within the cache, block size within the main memory portion, associativity within the cache or combinations thereof.

8. The method of claim 6, wherein the software parameter comprises a replacement algorithm.

9. The method of claim 1, wherein the method for configuring the memory subsystem is executed during run time of the computing system.

10. The method of claim 1, wherein the step of expressing the performance metrics as an explicit function further comprises:
connecting system performance statistics to the system performance metrics; and
using this connection to develop the explicit function.

11. The method of claim 10, wherein the system performance metrics comprise a miss ratio comprising a ratio of misses to a memory subsystem cache to hits to the memory subsystem cache.

12. The method of claim 10, wherein the memory subsystem comprises a cache and the system performance statistics comprise cache performance statistics.

13. The method of claim 12, wherein the cache performance statistics comprise cache residency time, single residency time, inter-hit time or combinations thereof.

14. The method of claim 1, wherein the step of expressing the performance metrics as an explicit function further comprises:
processing the histogram data associated with each arrangement of the configuration parameters to determine an empirical density for each arrangement of the configuration parameters, the empirical density comprising a probability that a value of a given system performance statistic falls between a given set of values; and
using the histogram data to establish the parametric density function further comprising using the empirical density for each arrangement of the configuration parameters to establish the parametric density function.

15. The method of claim 14, wherein the histogram data is collected from the computing system during runtime.

16. The method of claim 14, wherein the histogram data is collected from a memory subsystem cache simulation of the computing system.

17. The method of claim 14, wherein the step of collecting the histogram data further comprises collecting the histogram data over different time ranges and at varying granularity.

18. The method of claim 14, wherein:
the step of expressing the performance metrics as an explicit function further comprises using the parametric density function for the different arrangements of the configuration parameters to establish a functional dependence between the density parameters and the configuration parameters; and
the step of using the parametric density function to determine the density function further comprises using the established functional dependence to determine the density function.

19. The method of claim 18, wherein the step of identifying a performance goal for the computing system further comprises using the explicit function to determine mean, standard deviation and higher order moments of the performance metrics in terms of the configuration parameters.

20. The method of claim 19, wherein the step of using the values for the performance metrics to calculate values for the configuration parameters further comprises using the mean, standard deviation and higher order moments to identify a preferred set of configuration parameters for the identified performance goal.

21. A non-transitory computer-readable storage medium containing a computer-readable code that when read by a computer causes the computer to perform a method for configuring a memory subsystem of a computing system, the method comprising:
expressing performance metrics of the computing system hosting applications that utilize the memory subsystem as an explicit function of configuration parameters of the memory subsystem and workload parameters of the memory subsystem by:
collecting histogram data for system performance statistics of the computing system for a plurality of different arrangements of the configuration parameters;
using the histogram data to establish a parametric density function comprising a plurality of density parameters and the plurality of arrangements of the configuration parameters;
using the parametric density function to determine a density function of the performance metrics as a function of the configuration parameters; and
using the density function to determine the explicit function of the performance metrics configuration parameters and workload parameters;
identifying a performance goal for the computing system, the performance goal comprising values for the performance metrics;
using the values for the performance metrics in the explicit function of performance metrics, configuration parameters and workload parameters to calculate values for the configuration parameters that achieve the identified performance goal; and
implementing the calculated values of the configuration parameters in the memory subsystem.

22. The non-transitory computer-readable storage medium of claim 21, wherein the memory subsystem comprises a hybrid memory system comprising two distinct types of memory selected from the group consisting of static random access memory, dynamic random access memory, phase change memory, NAND flash memory and NOR flash memory.

23. The non-transitory computer-readable storage medium of claim 21, wherein:
the step of expressing the performance metrics as an explicit function further comprises:
processing the collected histogram data to estimate an empirical density for each arrangement of the configuration parameters;
using the empirical density for each arrangement of the configuration parameters to establish the parametric density function for the different arrangements of the configuration parameters;
using the parametric density function to establish a functional dependence the density parameters in the parametric density function on the configuration parameters; and
using the established functional dependence between the density parameters and the configuration parameters to determine the explicit function between performance metrics and configuration parameters.

* * * * *